(12) United States Patent
Goldman (10) Patent No.: US 10,728,975 B2
(45) Date of Patent: Jul. 28, 2020

(54) BINARY SIGNALING VIA POWER SWITCHING

(71) Applicant: ZODIAC POOL SYSTEMS LLC, Carlsbad, CA (US)

(72) Inventor: David Goldman, Carlsbad, CA (US)

(73) Assignee: ZODIAC POOL SYSTEMS LLC, Carlsbad, CA (US)

( * ) Notice: Subject to any disclaimer, the term of this patent is extended or adjusted under 35 U.S.C. 154(b) by 0 days.

(21) Appl. No.: 16/358,412

(22) Filed: Mar. 19, 2019

(65) Prior Publication Data

US 2019/0297699 A1    Sep. 26, 2019

Related U.S. Application Data

(60) Provisional application No. 62/645,380, filed on Mar. 20, 2018.

(51) Int. Cl.
*H05B 33/08*     (2020.01)
*H05B 45/20*     (2020.01)
*E04H 4/14*      (2006.01)
*H05B 45/37*     (2020.01)
*H05B 47/185*    (2020.01)
(Continued)

(52) U.S. Cl.
CPC .............. *H05B 45/20* (2020.01); *E04H 4/148* (2013.01); *H05B 45/37* (2020.01); *H05B 47/185* (2020.01); *F21W 2131/401* (2013.01); *H04B 3/542* (2013.01)

(58) Field of Classification Search
CPC ................ H05B 33/08; H05B 33/0809; H05B 33/0815; H05B 33/086; H05B 33/0863; H05B 37/02; H05B 37/0263; H05B 45/20; H05B 47/185; H04B 3/542; E04H 4/148; F21W 2131/401
See application file for complete search history.

(56) References Cited

U.S. PATENT DOCUMENTS 8,749,143 B1 * 6/2014 Saddig ............... H05B 33/0863
                                                  315/82
2003/0048632 A1 * 3/2003 Archer .................... E04H 4/148
                                                  362/101
(Continued)

FOREIGN PATENT DOCUMENTS

WO    2009058297    5/2009
WO    2016176653    11/2016

OTHER PUBLICATIONS

International Application No. PCT/US2019/023024, International Search Report and Written Opinion dated Jul. 16, 2019, 13 pages.

*Primary Examiner* — Thai Pham
(74) *Attorney, Agent, or Firm* — Kilpatrick Townsend & Stockton LLP; Dean W. Russell (57) ABSTRACT

Described is a lighting system that includes a lighting device and a switching device. The switching device controls application of lighting power to the lighting device. Further, the lighting system includes an automation system that includes a non-transitory computer-readable medium having instructions stored thereon. The instructions are executable by a processing device to receive a lighting profile selection. Additionally, the instructions are executable to cycle the switching device to transmit a binary signal to the lighting device. The binary signal identifies the lighting profile selection and instructs the lighting device to emit a lighting profile identified by the binary signal.

19 Claims, 4 Drawing Sheets

(51) Int. Cl.
*F21W 131/401* (2006.01)
*H04B 3/54* (2006.01)

(56) References Cited

U.S. PATENT DOCUMENTS

| | | | |
|---|---|---|---|
| 2011/0095709 A1* | 4/2011 | Diehl | F21V 23/04 |
| | | | 315/363 |
| 2014/0203710 A1* | 7/2014 | Li | H05B 33/0857 |
| | | | 315/129 |
| 2014/0210373 A1* | 7/2014 | Baret | H05B 37/0263 |
| | | | 315/294 |
| 2016/0323952 A1* | 11/2016 | Li | H05B 33/0815 |

* cited by examiner

FIG. 4

BINARY SIGNALING VIA POWER SWITCHING

CROSS-REFERENCE TO RELATED APPLICATION

This application claims the benefit of and priority to U.S. Provisional Application Ser. No. 62/645,380, filed Mar. 20, 2018, entitled "BINARY SIGNALING VIA POWER SWITCHING," the entire contents of which are hereby incorporated by this reference.

TECHNICAL FIELD

The field of the present disclosure relates generally to lighting systems. More specifically, the present disclosure relates to binary signaling to control output of a pool lighting system.

BACKGROUND

For pool lighting, it may be desirable to control a color and brightness of light output by a pool lighting system. Providing control signals to a controller of the pool lighting system may present challenges. For example, while wireless communication signals (e.g., radio frequency signals) provide an inexpensive and effective mechanism to control electronics, the wireless communication signals are unable to penetrate substantial depths of water to reach any submerged controller of the pool lighting system. Thus, the radio frequency signal may be completely attenuated before reaching the controller of the pool lighting system. Moreover, a system relying on counting power signal pulses to control a change of the pool lighting system to a lighting profile associated with the number of power signal pulses detected may be slow due to time requirements of the on and off pulse cycles. Further, the number of lighting profiles available to the pool lighting system may be limited due to an amount of time associated with each on and off pulse cycle.

Because pool lighting systems typically use 12V AC power, a transformer is often positioned between the pool lighting systems and a primary power source (e.g., 120V AC). Communication signals transmitted along powerlines (e.g., powerline communication schemes such as X10, UPB, Homeplug, etc.) are generally unable to cross a transformer, which prevents provision of the communication signals across already existing wiring. Implementation of the powerline communication scheme may require new firmware, a Lo2Hi and Hi2Lo modem, error checking, independent addressing, and new hardware (e.g., a coupler across the transformer). The additional components used in such a powerline communication scheme may add excessive costs and complexity for installation of a system to existing pool lighting systems. This cost and complexity may lead to reduced adoption by consumers and dealers of the pool lighting systems. Further, adding additional (or proprietary) components adds to the complexity of the product itself, which increases the opportunities for failure and potentially makes the product less reliable. The powerline communication scheme may also have a slow latency response.

SUMMARY

The terms "disclosure," "the disclosure," "this disclosure" and "the present disclosure" used in this patent are intended to refer broadly to all of the subject matter of this patent and the patent claims below. Statements containing these terms should be understood not to limit the subject matter described herein or to limit the meaning or scope of the patent claims below. Embodiments of the subject matter covered by this patent are defined by the claims below, not this summary. This summary is a high-level overview of various aspects of the subject matter of the present disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present disclosure, a lighting system includes a lighting device and a switching device. The switching device controls application of lighting power to the lighting device. Further, the lighting system includes an automation system that includes a non-transitory computer-readable medium having instructions stored thereon. The instructions are executable by a processing device to receive a lighting profile selection. Additionally, the instructions are executable to cycle the switching device to transmit a binary signal to the lighting device. The binary signal identifies the lighting profile selection and instructs the lighting device to emit a lighting profile identified by the binary signal.

In an additional embodiment of the present disclosure, a method includes receiving, at an automation system of a lighting system, a light profile indication. The method also includes cycling a power switching device to generate a binary signal representing the light profile indication. Further, the method includes receiving, at a lighting device of the lighting system, the binary signal and controlling the lighting device to emit a light profile associated with the light profile indication.

In an additional embodiment of the present disclosure, a lighting device includes a light that receives a lighting voltage. The lighting device also includes a lighting controller. The lighting controller includes a non-transitory computer-readable medium having instructions stored thereon that are executable by a processing device to receive a binary signal from the lighting voltage. The instructions are also executable by the processing device to decode the binary signal to identify a lighting profile selection of the light and control the light to emit the lighting profile selection.

DETAILED DESCRIPTION

The subject matter of embodiments of the present disclosure is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Certain aspects and examples of the present disclosure relate to systems and methods for providing multiple color combinations for a pool lighting system without the addition of excess hardware or proprietary components between an automation system and the lights of the pool lighting system. In some aspects, an automation system may be communicatively coupled with a relay that provides power to the pool lighting system. The relay is controllable by the automation system to open and close in a manner that creates a timed, binary signal. In additional aspects, a light of the pool lighting system may be pre-programmed to receive the binary signals from the relay and to control a plurality of light-emitting diodes ("LEDs") to project a particular color or light show based on the received binary signals.

In some aspects, the binary signals generated by the automation system may provide a large number of color and mode options for the lights of the pool lighting system with a relatively small number of pulses provided by the relay. For example, the system may use time slots associated with the pulses. The time slots associated with the pulses may allow a color or mode to be selected in an efficient manner because each time slot represents a data bit that is either in an on state or an off state. According to some aspects of the present disclosure, the automation system may enable the light of the pool lighting system to change a color or mode multiple times using a same amount of time as a single off and on pulse cycle of the pool lighting system. This greatly increases the speed of communication in comparison with other lighting profile selection techniques. Further, a series of on or off pulses may be used as bits to indicate a change between the preset color modes.

Systems, according to some aspects of the present disclosure, may remove a requirement for a modem (of any type) to insert communications into the power lines (hot or neutral) on top of, or in addition to, an alternating current ("AC") sine wave. In additional aspects, the system may also remove a need for more than two wires for power. In further aspects, the system may also remove a need for a coupler device to transfer a powerline communication signal from high-voltage wires to low-voltage wires when a transformer is used.

Figure 1:
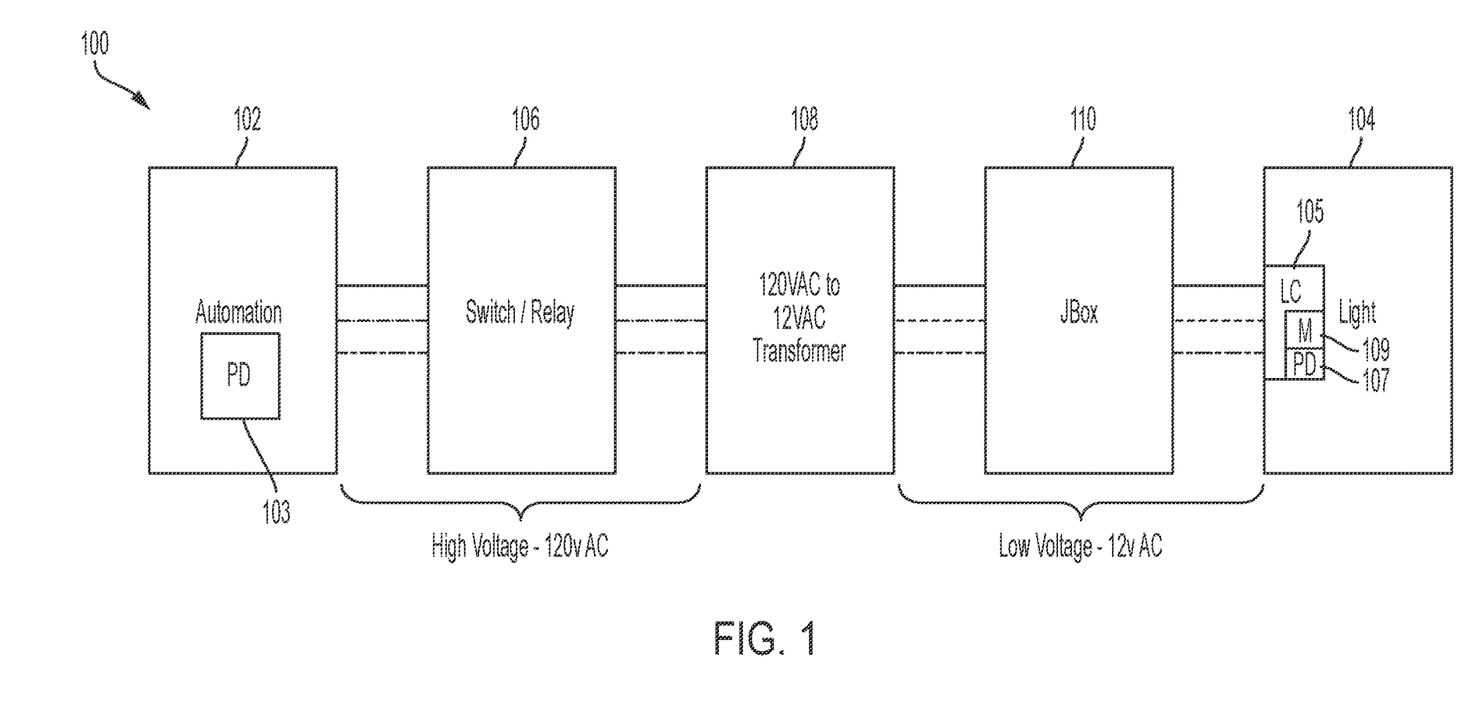
FIG. 1 is a block diagram of an example of a lighting system, according to certain embodiments of the present disclosure.

Turning to the figures, FIG. 1 is an example of a lighting system 100 that may be used to implement aspects of the present disclosure. The lighting system includes an automation system 102 communicatively coupled to a lighting device 104. In some aspects, the lighting device 104 may be positioned in an environment having water. For example, the lighting device 104 may represent a light in a swimming pool. In some aspects, the automation system may include a processing device capable of controlling the lighting device 104 to emit light signals in multiple different colors. The automation system 102 is communicatively coupled to the lighting device 104 via a switch or relay 106 (i.e., a power switching device), a transformer 108, and a junction box 110. In an example, the transformer 108 may be a standard 120 VAC-to-12 VAC transformer. That is, the transformer 108 transforms a 120V AC power supply to a 12V AC power output. As used in FIG. 1, the lighting device 104 is powered by a 12V AC voltage. The 12V AC voltage provided to the lighting device 104 may be transformed from a 120V AC grid electric power supply.

The automation system 102 may include a processing device 103 that is able to execute instructions to cause the relay 106 to open and close in a timed manner to create a timed, binary signal. The binary signal may cause the lighting device 104 to switch between various colors. In some aspects, the binary signal may also cause the lighting device 104 (and other lights in the lighting system 100) to perform multiple, unique light shows. In one or more examples, the binary signal generated by the automation system 102 using the relay 106 may allow for significantly more color combinations of lights in the lighting system 100 using the components of an existing system. Additional conductors or wires may be positioned between the junction box 110 and the lighting device 104. For example, the lighting device 104 may represent multiple lights positioned within a pool. The additional conductors or wires from the junction box 110 may provide power from the junction box 110 to the additional lights represented by the lighting device 104.

In an example, the relay 106 may be a solid-state relay, such as a high power (HP) relay, to avoid a relay bounce that may affect a timing solution of the binary signal. In some aspects, the use of a binary switching scheme may use new firmware support for the automation system 102. Compared to a two-way scheme (e.g., a powerline communication scheme), the binary switching scheme may be implemented without a Hi2Lo or Lo2Hi modem, error checking, or independent addressing. Additional benefits of the binary switching scheme over a two-way scheme may include a reduced implementation cost, easy compliance with communication standards, no changes to a power center enclosure of the lighting system 100, and no issues with inductive connectors.

Without using the binary signal scheme described herein, the lighting device 104 may be controlled by rapidly turning the lighting device 104 on and off. The lighting device 104 may be programmed such that the color changes sequentially with each power iteration. For example, if the seventh color is desired, the lighting device 104 may be turned off and on seven times for the lighting device 104 to output the seventh color. Using the binary signal scheme, approximately 128 different color combinations could be signaled in a similar amount of time as used to cycle the relay 106 seven times.

For example, each "bit" of the binary signal scheme is represented as a 1 when the relay is closed and a zero when the relay is opened. Thus, if seven time slots representing the bits are available, the total number of different options represented by the seven time slots are 2 (i.e., the number of states for each bit) to the power of 7 (i.e., the number of bits). Each of the different options represented by the binary signal scheme may be associated with a different light profile available to the lighting device 104. Thus, the lighting device 104 may include a lighting controller 105 with a processing device 107 that is able to execute instructions from a non-transitory computer-readable medium 109 to display 128 different profiles when the seven time slots (i.e., seven bits) are available for the binary signal scheme. As used herein, the term "light profile" may refer to a color, a lighting show (e.g., a programmed sequence of colors and brightness levels output by the lighting device 104), a brightness, or a combination thereof of a light emitted by the lighting device 104.

Figure 2:
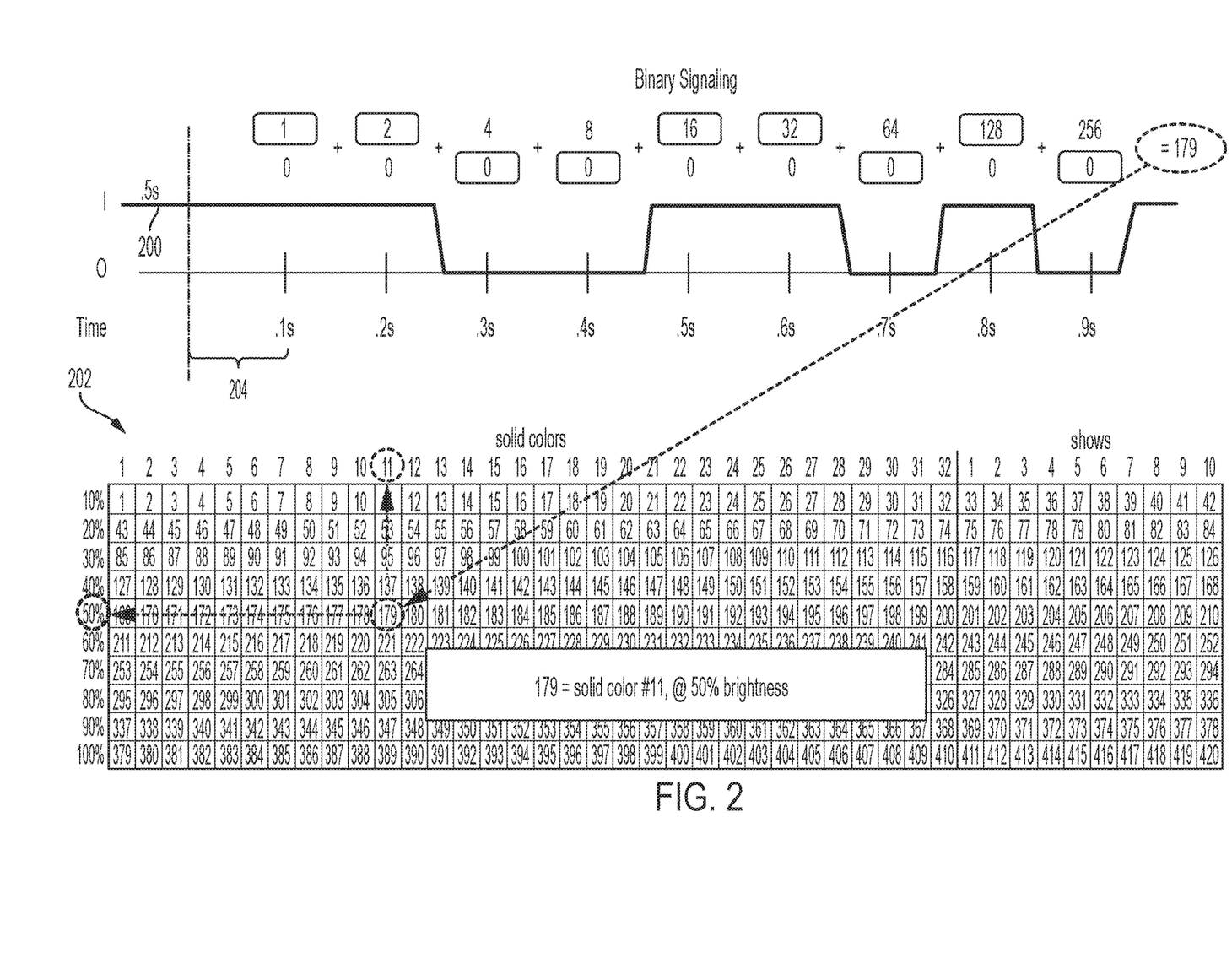
FIG. 2 is an example of a binary signal scheme that is created by a relay of the lighting system of FIG. 1, according to certain embodiments of the present disclosure.

To help illustrate, FIG. 2 shows an example of a binary signal 200 that may be created by the relay 106 of FIG. 1. In some aspects, the timing of the opening and closing of the relay 106 of FIG. 1 may cause the binary signal 200 to vary with respect to the time intervals between the on and off intervals of the binary signal 200. FIG. 2 also shows an example of a grid 202 illustrating the number of combinations based on the solid colors and shows available for the lighting device 104 at different brightness levels.

As illustrated, the binary signal 200 includes 9 time slots 204. More or fewer time slots 204 are also contemplated. Each time slot may be 0.1 seconds in length, and the time slots can be longer or shorter depending on a switching speed of the relay 106. For example, a faster relay 106 may use shorter time slots (e.g., 0.05 seconds) while a slower relay 106 may use longer time slots (e.g., 0.15 seconds).

A high or low value may be recorded for each of the time slots 204 to determine the value of the binary signal for control of the lighting device 104. Each of the time slots 204 includes a different value when the binary signal 200 is high in a particular time slot 204. For example, the value of the first time slot is $2^0=1$, the value of the second time slot is $2^1=2$, the value of the third time slot is $2^2=4$, the value of the fourth time slot is $2^3=8$, etc. The numerical value of the binary signal 200 may be calculated by adding the time slot values for each of the time slots 204 with a high signal. As illustrated, the time slot values for each of the time slots 204 add up to a numerical value of 179.

A lighting controller (e.g., a processor and a memory such as a non-transitory computer-readable medium) at the lighting device 104 may calculate the numerical value of the binary signal 200 and compare the numerical value of the binary signal 200 to a register in the memory. The register, for example, associates the numerical value of the binary signal 200 to numbers associated with light profiles of the lighting device 104. The register in the memory is graphically represented by the grid 202. In the grid 202, the numerical value of the binary signal 200 may represent 32 different colors and 10 different shows at 10 different brightness levels. The illustrated numerical value of 179, as illustrated in the grid 202, represents a solid color 11 at 50 percent brightness.

Figure 3:
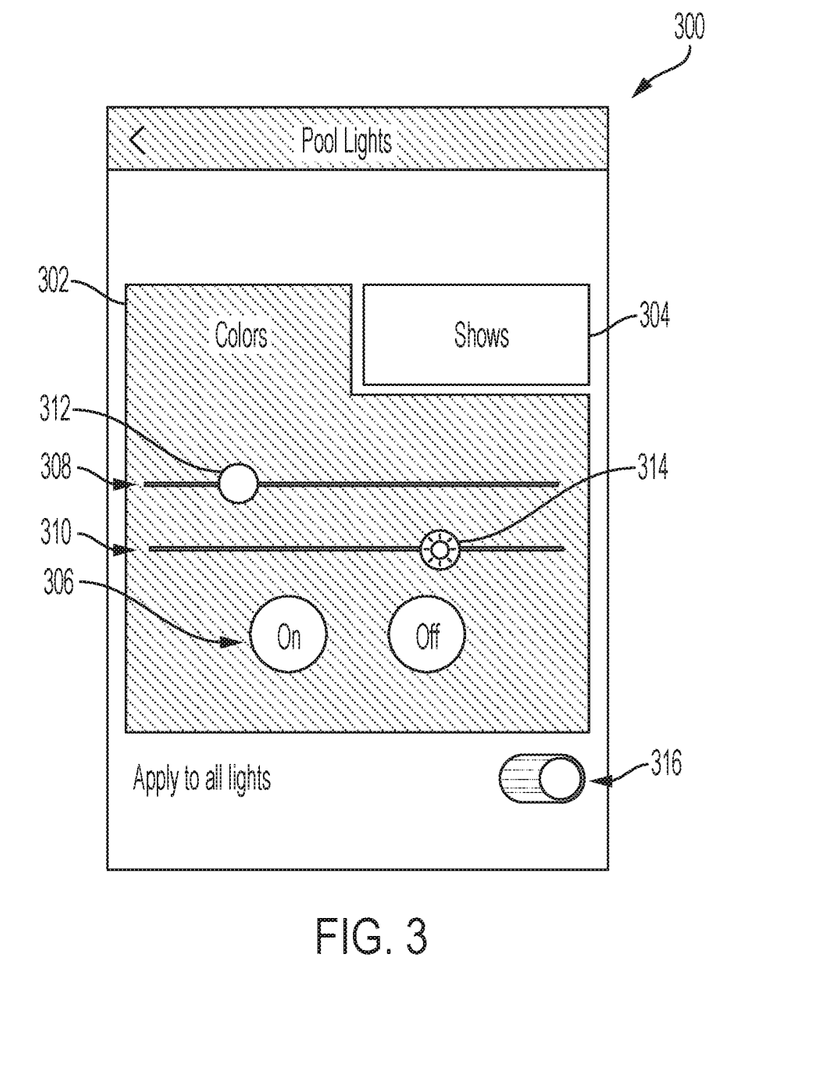
FIG. 3 is an example of a wireframe concept used to control the lighting system of FIG. 1 with the binary signal scheme of FIG. 2, according to certain embodiments of the present disclosure.

In some aspects, the lighting device 104 of FIG. 1 may be pre-programmed to receive the binary signal to operate a plurality of light-emitting diodes ("LEDs") to project a particular color or light show. FIG. 3 shows a non-limiting example of a wireframe concept 300 that may be used for controlling lights using the binary signal 200 of FIG. 2 to project a particular color or light show. The wireframe concept 300 is described below using the lighting system 100 of FIG. 1 and the binary signal 200 of FIG. 2, although other implementations are possible without departing from the scope of the present disclosure. The wireframe concept 300 includes a colors tab 302 and a shows tab 304 to control the color and light show, respectively. The colors tab 302 may include virtual or tactile buttons 306 to allow the lighting device 104 to be turned on and off. The wireframe concept 300 also includes virtual or tactile sliders 308 and 310 that allow a desired color and brightness to be selected, respectively. In some aspects, the slider 308 may correspond to available colors and may include a color spectrum overlaid on the slider 308 to allow the color to be changed. In some aspects, a virtual or tactile selector 312 positioned on the slider 308 may change colors to correspond to a selected color based on the location of the selector 312 on the slider 308. In additional aspects, an RGB value associated with the selected color may be displayed.

The slider 310 may include a virtual or tactile selector 314. In some aspects, the position of the selector 314 on the slider 310 may correspond to the brightness of the color based on the amount of power transmitted to the lighting device 104. In additional and alternative aspects, sliding the selector 314 from left to right along the slider 310 may cause the brightness of the lighting device 104 to increase. The wireframe concept 300 may also include a selection option 316 that enables the selections of the lighting device 104 to be applied to all of the lights in the lighting system 100. The shows tab 304 may include selection options corresponding to displaying a light show based on the timing associated with the binary signal 200. In one example, the slider 308 may allow for a selection of up to 50 unique colors. The selection options included in the shows tab 304 may allow for 20 unique shows. The 50 colors and 20 shows may equate to 70-72 different color modes, for example. The slider 310 may allow for five different levels of brightness, equating to between 350-360 unique options, for example.

To transmit the selection from the wireframe concept 300 to the lighting device 104, the automation system 102 may identify a numerical value of a binary signal 200 associated with the color, show, and brightness selected. Once the numerical value of the binary signal 200 is determined, the automation system 102 controls the relay 106 to provide the binary signal 200 with the determined numerical value to the lighting device 104. The lighting controller of the lighting device 104 decodes the numerical value of the binary signal 200 and transitions an output of the lighting device 104 to the light profile identified by the wireframe concept 300.

Figure 4:
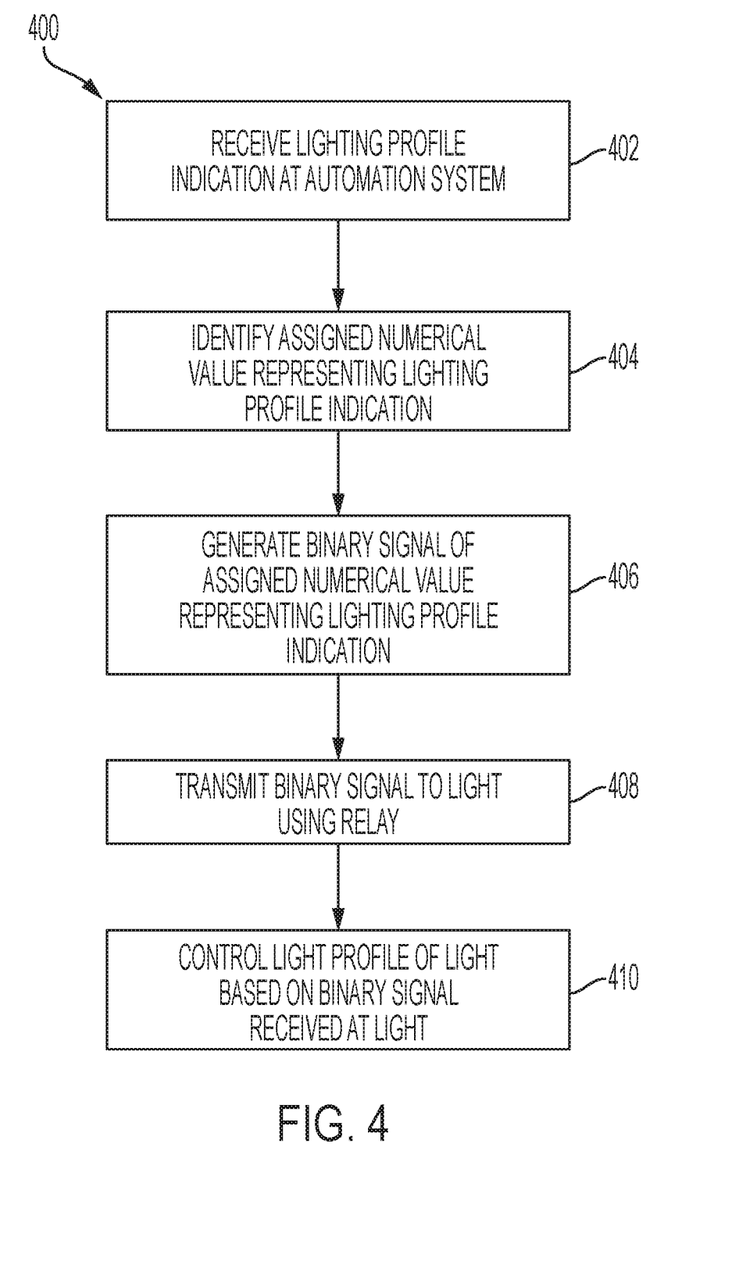
FIG. 4 is a flow chart of a process for controlling a light output of the lighting system of FIG. 1 using the binary signal scheme of FIG. 2, according to certain embodiments of the present disclosure.

FIG. 4 is a flow chart of a process 400 for controlling a light output of the lighting system 100 using the binary signal scheme. At block 402, the process 400 involves receiving a lighting profile indication at the automation system 102 of the lighting system 100. In an example, the automation system 102 includes a user interface, such as the wireframe concept 300 described above with respect to FIG. 3, that provides a user with an ability to select a color, a brightness, a show profile, or any other lighting profiles available for the lighting device 104 of the lighting system 100.

At block 404, the process 400 involves identifying an assigned numerical value representing the lighting profile indication. For example, the automation system 102 may include a memory (e.g., a non-transitory computer-readable medium) that stores a register capable of encoding a user selected lighting profile into a representative numerical value of the binary signal 200 provided to the lighting device 104. In an example, such a register may be represented by the grid 202 where the automation system 102 uses the color or show value and the brightness level to determine the numerical value assigned to the selected lighting profile.

At block 406, the process 400 involves generating a binary signal 200 of the assigned numerical value representing the lighting profile indication. As discussed above, the binary signal 200 includes time slots 204 of a specified length (e.g., 0.1 seconds). Each of the time slots 204 may represent a different bit in the binary signal 200, and each of these bits may have a different value associated with the bits when the binary signal 200 is high. For example, the value of the first time slot is $2^0=1$, the value of the second time slot is $2^1=2$, the value of the third time slot is $2^2=4$, the value of the fourth time slot is $2^3=8$, etc. The numerical value of the binary signal 200 may be calculated by adding the time slot values for each of the time slots 204 with a high signal. Thus, the automation system 102 may encode the binary signal

200 such that the binary signal 200 represents the numerical value identified at block 404 that represents the user selected lighting profile.

At block 408, the process 400 involves transmitting the binary signal 200 to the lighting device 104 using the relay 106. As discussed above, the relay 206 may switch on and off to transmit the binary signal 200 representing the numerical value identified at block 404. The binary signal 200 is transmitted as high or low signals from the power source of the lighting system 100.

At block 410, the process 400 involves controlling the light profile of the lighting device 104 based on the binary signal 200 received at the lighting device 104. In an example, a lighting controller of the lighting device 104 receives the binary signal 200 and decodes the binary signal 200. In such an example, the lighting controller (e.g., a processor and a memory) may calculate the numerical value of the binary signal 200. Once the numerical value is calculated, the lighting controller may compare the numerical value of the binary signal 200 to a register in the memory that associates the numerical value of the binary signal 200 to light profiles of the lighting device 104. The register in the memory is graphically represented by the grid 202, as discussed above with respect to FIG. 2. Upon decoding the numerical value of the binary signal 200, the lighting controller transitions an output of the lighting device 104 to the lighting profile received at block 402.

The foregoing description of the examples, including illustrated examples, of the present subject matter has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. The illustrative examples described above are given to introduce the reader to the general subject matter discussed here and are not intended to limit the scope of the disclosed concepts.

In the following, further examples are described to facilitate the understanding of the subject matter of the present disclosure:

As used below, any reference to a series of examples is to be understood as a reference to each of those examples disjunctively (e.g., "Examples 1-4" is to be understood as "Examples 1, 2, 3, or 4").

Example 1 is a lighting system, comprising: a lighting device; a switching device configured to control application of lighting power to the lighting device; an automation system comprising a non-transitory computer-readable medium having instructions stored thereon, the instructions executable by a processing device to: receive a lighting profile selection; and cycle the switching device to transmit a binary signal to the lighting device, wherein the binary signal identifies the lighting profile selection and instructs the lighting device to emit a lighting profile identified by the binary signal.

Example 2 is the system of example 1, further comprising: a transformer configured to receive a first power from the switching device and to transfer the lighting power to the lighting device, wherein the binary signal is transmitted across the transformer to the lighting device.

Example 3 is the system of example 2, wherein the transformer comprises a 120 VAC-to-12 VAC transformer.

Example 4 is the system of examples 1-3, wherein the instructions are further executable by the processing device to: identify a numerical value associated with the lighting profile selection; and encode the binary signal to represent the numerical value associated with the lighting profile selection.

Example 5 is the system of examples 1-4, wherein the lighting device comprises an additional non-transitory computer-readable medium having additional instructions stored thereon, the additional instructions executable by an additional processing device to: receive the binary signal; decode the binary signal to identify the lighting profile selection; and control a light of the lighting device to emit the lighting profile identified by the binary signal.

Example 6 is the system of example 5, wherein decoding the binary signal to identify the lighting profile selection comprises: determining a numerical value of the binary signal; and comparing the numerical value of the binary signal to a set of numerical values associated with a set of lighting profiles to identify the lighting profile selection.

Example 7 is the system of examples 1-6, wherein the lighting device is positionable within a swimming pool.

Example 8 is the system of examples 1-7, wherein the switching device comprises a high power relay.

Example 9 is the system of examples 1-8, wherein the binary signal comprises a power signal transmitted over a plurality of time slots, wherein each time slot of the plurality of time slots represents a different bit of the binary signal.

Example 10 is a method, comprising: receiving, at an automation system of a lighting system, a light profile indication; cycling a power switching device to generate a binary signal representing the light profile indication; receiving, at a lighting device of the lighting system, the binary signal; and controlling the lighting device to emit a light profile associated with the light profile indication.

Example 11 is the method of example 10, wherein the binary signal represents a numerical value of the light profile indication.

Example 12 is the method of examples 10-11, further comprising: encoding, at the automation system, the binary signal based on a numerical value of the light profile indication; decoding, at the lighting device, the binary signal to the numerical value; and comparing, at the lighting device, the numerical value to a set of numerical values associated with a set of lighting profiles to identify the lighting profile indication.

Example 13 is the method of example 12, wherein the set of lighting profiles comprise at least 128 unique lighting profiles.

Example 14 is the method of examples 10-13, wherein the binary signal comprises a power signal transmitted over a plurality of time slots, wherein each time slot of the plurality of time slots represents a different bit of the binary signal.

Example 15 is the method of examples 10-14, wherein the binary signal comprises at least 7 bits.

Example 16 is a lighting device, comprising: a light configured to receive a lighting voltage; a lighting controller comprising a non-transitory computer-readable medium having instructions stored thereon, the instructions executable by a processing device to: receive a binary signal from the lighting voltage; decode the binary signal to identify a lighting profile selection of the light; and control the light to emit the lighting profile selection.

Example 17 is the lighting device of example 16, wherein decoding the binary signal comprises: identifying a numerical value of the binary signal; and comparing the numerical value to a set of numerical values associated with a set of lighting profiles to identify the lighting profile selection.

Example 18 is the lighting device of examples 16-17, wherein the binary signal comprises a power signal transmitted over a plurality of time slots, wherein each time slot of the plurality of time slots represents a different bit of the binary signal.

Example 19 is the lighting device of examples 16-18, further comprising a transformer configured to transform a received voltage input at a first voltage level to the lighting voltage at a second voltage level.

Example 20 is the lighting device of examples 16-19, wherein the lighting device is controllable to output at least 128 unique lighting profiles.

Different arrangements of the components depicted in the drawings or described above, as well as components and steps not shown or described are possible. Similarly, some features and sub-combinations are useful and may be employed without reference to other features and sub-combinations. Embodiments of the presently subject matter have been described for illustrative and not restrictive purposes, and alternative embodiments will become apparent to readers of this patent. Accordingly, the present disclosure is not limited to the embodiments described above or depicted in the drawings, and various embodiments and modifications may be made without departing from the scope of the claims below.

That which is claimed is:

1. A lighting system, comprising:
   a lighting device;
   a switching device configured to control application of lighting power to the lighting device; and
   an automation system comprising a non-transitory computer-readable medium having instructions stored thereon, the instructions executable by a processing device to:
   receive a lighting profile selection; and
   cycle the switching device to transmit an encoded binary signal to the lighting device, wherein the encoded binary signal is a binary representation of a numerical value identifying the lighting profile selection and is decodable by the lighting device to instructs the lighting device to emit a lighting profile identified by the encoded binary signal.

2. The system of claim 1, further comprising:
   a transformer configured to receive a first power from the switching device and to transfer the lighting power to the lighting device, wherein the encoded binary signal is transmitted across the transformer to the lighting device.

3. The system of claim 2, wherein the transformer comprises a 120 VAC-to-12 VAC transformer.

4. The system of claim 1, wherein the instructions are further executable by the processing device to:
   identify the numerical value associated with the lighting profile selection; and
   encode the encoded binary signal to represent the numerical value associated with the lighting profile selection.

5. The system of claim 1, wherein the lighting device comprises an additional non-transitory computer-readable medium having additional instructions stored thereon, the additional instructions executable by an additional processing device to:
   receive the encoded binary signal;
   decode the encoded binary signal to identify the lighting profile selection; and
   control a light of the lighting device to emit the lighting profile identified by the encoded binary signal.

6. The system of claim 5, wherein decoding the encoded binary signal to identify the lighting profile selection comprises:
   determining the numerical value of the encoded binary signal; and
   comparing the numerical value of the encoded binary signal to a set of numerical values associated with a set of lighting profiles to identify the lighting profile selection.

7. The system of claim 1, wherein the lighting device is positionable within a swimming pool.

8. The system of claim 1, wherein the switching device comprises a high power relay.

9. The system of claim 1, wherein the encoded binary signal comprises a power signal transmitted over a plurality of time slots, wherein each time slot of the plurality of time slots represents a different bit of the encoded binary signal.

10. A method, comprising:
    receiving, at an automation system of a lighting system, a light profile indication;
    cycling a power switching device to generate an encoded binary signal representing a binary representation of a numerical value identifying the light profile indication;
    receiving, at a lighting device of the lighting system, the encoded binary signal; and
    controlling the lighting device to emit a light profile associated with the light profile indication.

11. The method of claim 10, further comprising:
    encoding, at the automation system, the encoded binary signal based on the numerical value of the light profile indication;
    decoding, at the lighting device, the encoded binary signal to the numerical value; and
    comparing, at the lighting device, the numerical value to a set of numerical values associated with a set of lighting profiles to identify the lighting profile indication.

12. The method of claim 11, wherein the set of lighting profiles comprise at least 128 unique lighting profiles.

13. The method of claim 10, wherein the encoded binary signal comprises a power signal transmitted over a plurality of time slots, wherein each time slot of the plurality of time slots represents a different bit of the encoded binary signal.

14. The method of claim 10, wherein the encoded binary signal comprises at least 7 bits.

15. A lighting device, comprising:
    a light configured to receive a lighting voltage;
    a lighting controller comprising a non-transitory computer-readable medium having instructions stored thereon, the instructions executable by a processing device to:
    receive an encoded binary signal from the lighting voltage, wherein the encoded binary signal is generated by a power switching device and the encoded binary signal represents a number identifying a lighting profile selection;
    decode the encoded binary signal to identify the lighting profile selection of the light; and
    control the light to emit the lighting profile selection.

16. The lighting device of claim 15, wherein decoding the encoded binary signal comprises:
    identifying a numerical value of the encoded binary signal; and
    comparing the numerical value to a set of numerical values associated with a set of lighting profiles to identify the lighting profile selection.

17. The lighting device of claim 15, wherein the encoded binary signal comprises a power signal transmitted over a plurality of time slots, wherein each time slot of the plurality of time slots represents a different bit of the binary signal.

18. The lighting device of claim 15, further comprising a transformer configured to transform a received voltage input at a first voltage level to the lighting voltage at a second voltage level.

19. The lighting device of claim 15, wherein the lighting device is controllable to output at least 128 unique lighting profiles.

\* \* \* \* \*